United States Patent [19]
Rais

[11] Patent Number: 4,486,043
[45] Date of Patent: Dec. 4, 1984

[54] REUSABLE PLASTIC BOTTLE HANDLE

[76] Inventor: John M. Rais, P.O. Box 1781, Darien, Conn. 06820

[21] Appl. No.: 572,447

[22] Filed: Jan. 20, 1984

[51] Int. Cl.³ .............................................. B65D 23/10
[52] U.S. Cl. .............................. 294/27 H; 215/100 A; 220/94 A; 294/31.2
[58] Field of Search ...................... 294/27 H, 31.2, 33, 294/27 R; 220/94 R, 94 A, 91; 215/100 A; 248/145.6

[56] References Cited

U.S. PATENT DOCUMENTS

| | | | |
|---|---|---|---|
| 1,825,897 | 10/1931 | Brooke | 294/31.2 |
| 3,056,622 | 10/1962 | Hilderbrandt et al. | 294/31.2 |
| 3,250,562 | 5/1966 | Frasure et al. | 294/31.2 |
| 3,326,591 | 5/1965 | Richter et al. | 294/32 |
| 3,488,078 | 1/1970 | Cooperstein | 294/31.2 |
| 3,688,936 | 9/1972 | Killigrew, Jr. | 294/27 H |
| 3,990,596 | 11/1976 | Hoftman | 215/11 R |
| 4,299,366 | 11/1981 | Kurzius | 248/145.6 |
| 4,368,826 | 1/1983 | Thompson | 215/100 A |
| 4,379,578 | 4/1983 | Schuler | 294/31.2 |

Primary Examiner—James B. Marbert
Attorney, Agent, or Firm—Kramer and Brufsky

[57] ABSTRACT

A reusable handle for manipulating a plastic soft drink bottle. The handle has a hook-like projection on one end adapted to clamp to the neck of the bottle and a prong at its opposite end insertable between a cup-like base and the exterior annular wall of the bottle to secure the handle to the bottle. The intermediate portion of the handle between the hook-like projection and prong comprises an elongated strap of a rigidified cross-section running adjacent to and along the exterior wall of the bottle. The central portion of the strap is provided with a loop defining a finger grip so that the handle and bottle can be lifted and manipulated to pour the contents of the bottle.

6 Claims, 8 Drawing Figures

REUSABLE PLASTIC BOTTLE HANDLE

BACKGROUND OF THE INVENTION

1. Field of the Invention

This invention relates to a separable bottle handle and more particularly, a reusable handle adapted to be secured to a plastic soft drink bottle between the neck and base of the bottle to aid in lifting the bottle and dispensing the contents thereof.

2. Description of the Prior Art

Soft drink manufacturers have introduced larger sized bottles as an economy measure. These bottles, typically two liter liquid containing bottles, are made of plastic and are of a large exterior diameter such that handling and manipulating of the bottles to pour the contents is somewhat inconvenient, particularly for children.

The bottle is provided with a flange-like member near the neck above which a threaded portion is provided for reception of an aluminum closure cap. The base of the bottle has a cup-like base member which is adhesively secured to the bottom of the bottle and extends upwardly along the lower side wall of the bottle to rigidify the base and provide a smooth surface for seating the bottle on a plane surface.

It has been proposed heretofore to provide reusable handles for soft drink bottles. Examples of such handles are illustrated in U.S. Pat. Nos. 4,379,578; 4,368,826; 3,326,591; 3,056,622; 3,990,596; 4,299,366; and 3,488,078. However, none of the reusable handles illustrated in these patents are particularly suitable for use with a soft drink bottle of the type described, or if they are, operate in a manner completely different from the handle of the present invention, which is rigidly locked to the bottle so that the bottle cannot be accidently displaced relative to the handle during the pouring operation.

SUMMARY OF THE INVENTION

In accordance with the present invention, a reuseable handle is provided for manipulating a plastic soft drink bottle having a flange like projection at the neck of the bottle and a rigid cup-like base adhered to the bottom of the bottle to provide a seat enabling the bottle to be maintained in an upright condition on a plane surface. The handle has a substantially horizontal hook-like projection on one end adapted to clamp to the neck of the bottle beneath the flange and a substantially vertical, convex-concave, V-shaped prong at its opposite end insertable between the relatively rigid cup-like base and deformable annular wall of the bottle. The intermediate portion of the handle between the hook-like projection and prong comprises an elongated strap of a rigidified X or T-shaped cross-section running adjacent to and along the outer wall of the bottle. The central portion of the strap is provided with a loop defining a finger grip so that the strap and secured bottle can be lifted together and manipulated to pour the contents of the bottle.

BRIEF DESCRIPTION OF THE DRAWINGS

Further objects and advantages of the invention will become apparent in the following description and claims, and from the accompanying drawings, wherein:

DETAILED DESCRIPTION OF THE PREFERRED EMBODIMENT

Figure 2:
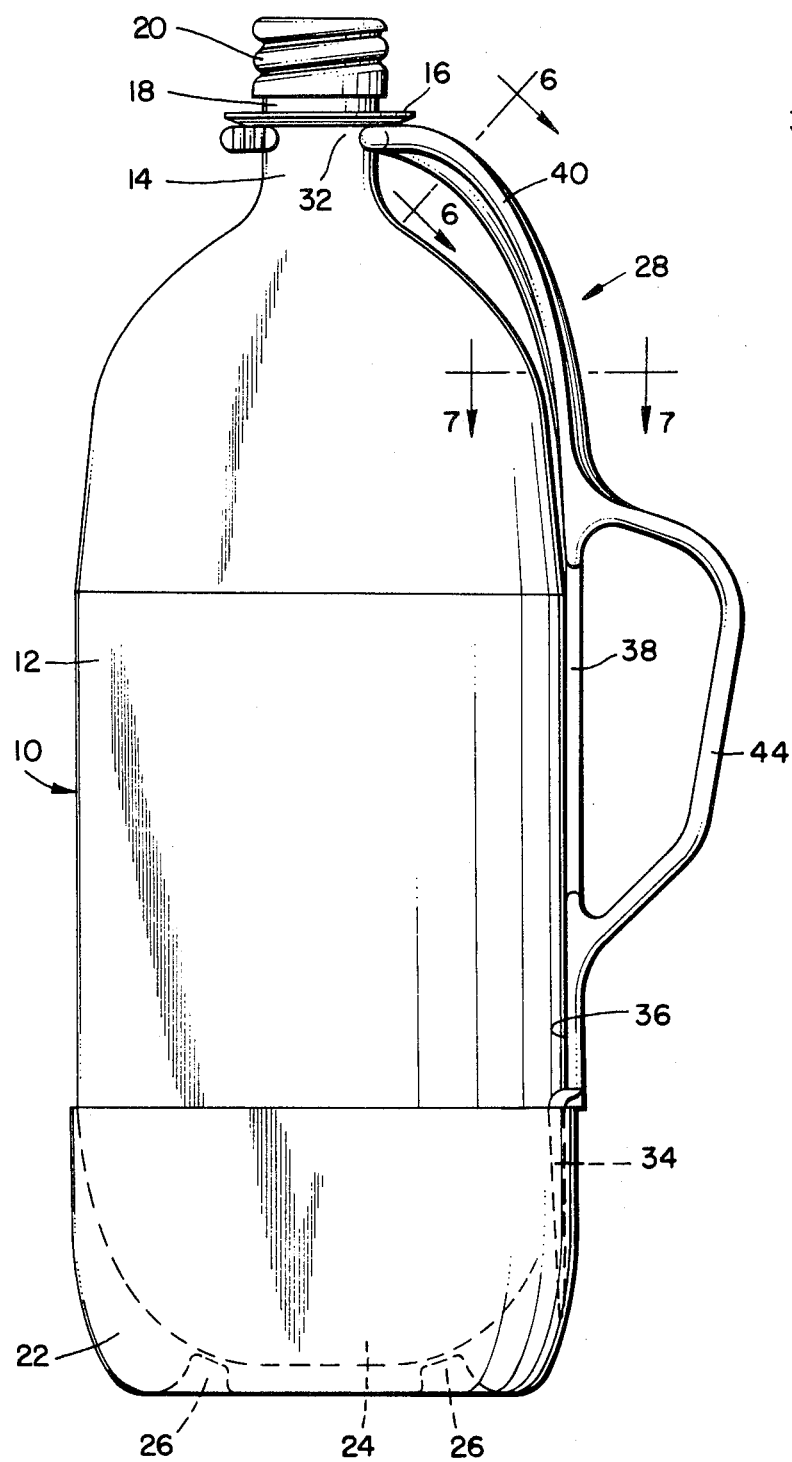
FIG. 2 is a side view in elevation of the handle and bottle of FIG. 1.
Figure 5:
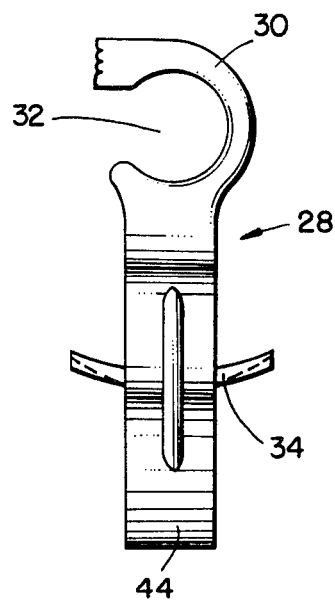
FIG. 5 is a top plan view of the handle shown in FIG. 3.
Figure 8:
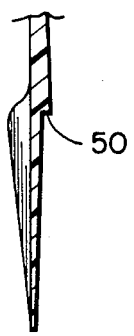
FIG. 8 is a cross-sectional view taken substantially along the plane indicated by line 8—8 of FIG. 3.
Figure 1:
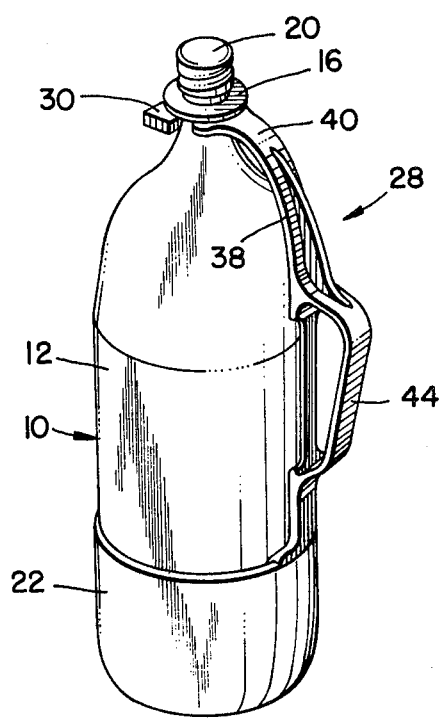
FIG. 1 is a perspective view of the handle of the present invention secured to a plastic soft drink bottle.
Figure 3:
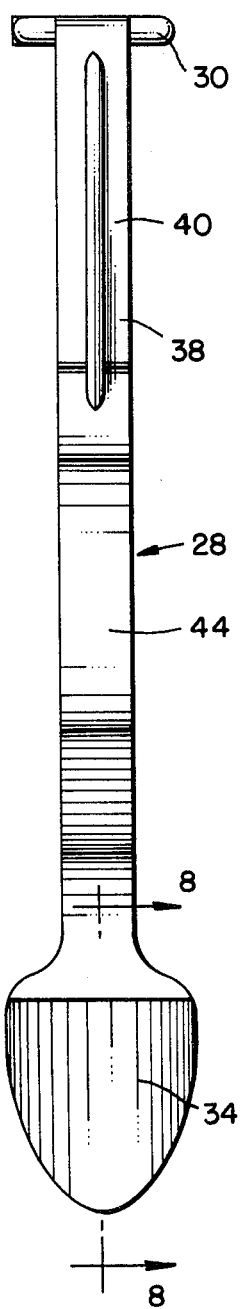
FIG. 3 is a front view in elevation of the handle shown in FIG. 2.
Figure 4:
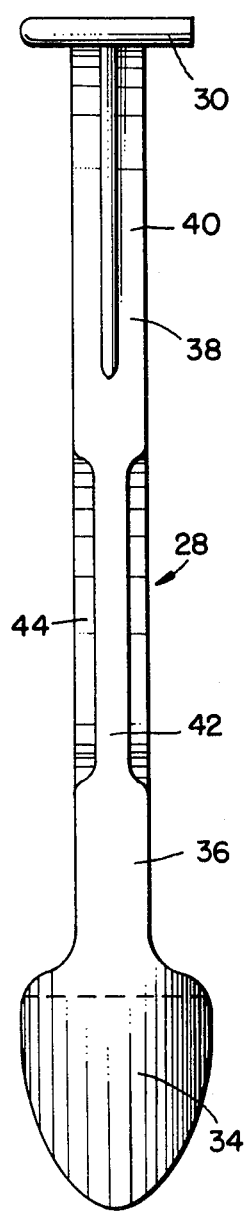
FIG. 4 is a rear view in elevation of the handle shown in FIG. 3.
Figure 6:
FIG. 6 is a cross-sectional view taken substantially along the plane indicated by line 6—6 of FIG. 2.
Figure 7:
FIG. 7 is a cross-sectional view taken substantially along the plane indicated by line 7—7 of FIG. 2.

Referring now to the drawings in detail, wherein like numerals indicate like elements throughout the several views, a plastic soft drink bottle 10 is illustrated in FIGS. 1 and 2. Soft drink bottle 10 includes a rather large diameter annular side wall 12 terminating in a smaller diameter neck 14 provided with an annular flange 16 above which the neck is threaded at 18 to receive an aluminum cap for closing the bottle. The bottom of the bottle is provided with a relatively rigid cup-like plastic base member 22 which is secured to the bottom 24 of the bottle 10 by adhesive or the like along an angular ring 26. The cup-like base member 22 extends upwardly along the lower portion of the side wall 12 of bottle 10 and the side wall 12 is deformable towards and away from the base member at the juncture of the upper edge of the cup-like base member 22 and the side wall 12 of bottle 10. Cup-like base member 22 serves to rigidify the bottom portion 24 of the relatively flexible plastic bottle 10 and provide a stand to support the bottle 10 on a plane surface.

A detachable, reusable strap-like handle 28 can be secured to bottle 10 as illustrated in FIGS. 1 and 2, to aid in manipulating the rather large bottle 10 so as to readily pour the contents therefrom.

Strap-like handle 28 is provided with a hook-like member 30 at one end thereof lying in a substantially horizontal plane. The hook-like member 30 is provided with an opening 32 of slightly less width than the diameter of the neck 14 of bottle 10, while the remainder of the interior surface of the hook-like member 30 is substantially semi-circular in plane elevation and has a diameter which approximates the diameter of the neck 14 of bottle 10.

The opposite end of the strap-like handle member 28 includes a substantially V-shaped prong element 34 having an outer surface or edge lying in a substantially vertical plane, beneath a horizontal shoulder or lip 50. The central portion of the prong 34, however, is bulged or struck out of the vertical plane in a concave-convex manner with the convex portion extending away from the interior surface 36 of the strap-like handle member 28, while the concave portion is adapted to complement the arc of the annular side wall 12 of bottle 10.

The hook-like member 30 and prong member 34 at opposite ends of the handle 28 are joined by a strap 38 having a first, arcuate portion 40 joined to the hook-like member 30 and a second, substantially vertical portion 42 joining the arcuate portion 40 to the prong 34. When secured to the bottle 10, the second, substantially vertical portion 42 of the strap 38 between the prong 34 and the hook 30 lies closely adjacent to the exterior side wall surface 12 of the bottle 10.

Integrally provided on the second, vertical portion 42 of the connecting strap 38 between the hook-like member 30 and prong 34 is a finger-gripping loop 44 molded integrally with, but spaced from the second portion 42 of the strap 28. Fingers can be inserted through the loop portion 44 to raise and tilt the strap-like handle 28 along with the bottle 10 to which it is secured.

As illustrated in FIG. 2, the arcuate portion 40 of the handle 28 between the hook-like member 30 and the prong member 34 is first T-shaped and then substantially X-shaped in cross-section in order to rigidify the strap-handle 28 and preclude substantial bending thereof while in use.

In use, the strap-like handle element 28 can be secured to bottle 10, as illustrated in FIG. 2, by first inserting the prong member 34 between the cup-shaped rigidifying base member 22 and the annular side wall 12 of bottle 10 at the juncture of the base and annular wall until lip or shoulder 50 seats on the top edge of member 22. Because of the convex-concave or bulbous central portion of the prong member 34, the adjacent interior of the side wall of the cup-shaped member 22 will be deformed outwardly providing a force in an opposite direction against the prong causing it to be securely clamped against the complementally shaped side wall 12 of the bottle 10 between the side wall 12 of the bottle 10 and the adjacent interior surface of the cup-like base member 22. Then, the hook-like member 30 is secured to the neck of the bottle 10 by passing the neck 14 through the opening 32, causing the hook-like member 30 to spread slightly until the neck passes through the opening 32 into snap engagement with the complementary semi-circular interior portion of hook-member 30. This will rigidly secure or lock the handle 28 to the bottle 10 with the finger loop portion 44 ready to be gripped by the user to raise, tilt and manipulate the bottle 10 so the contents can be poured therefrom upon removal of the cap from the threads above the flange 14. The vertical portion 42 of strap 38 lies adjacent to sidewall 12 of bottle 10 while arcuate portion 40 is spaced therefrom, but of a rigidified cross-section, precluding substantial deformation or twisting of handle 28 when the handle and bottle are lifted.

What is claimed as new is:

1. A reusable handle adapted to be secured to a bottle having an annular side wall terminating in a neck at one end and a bottom secured to a cup-like base at its opposite end, said handle comprising:
   a substantially vertical prong-like first portion at one end of said handle adapted to be inserted between the annular side wall of a bottle and the cup-like base portion thereof, said prong-like member having an convex-concave arcuate portion extending outwardly from the vertical plane thereof for contact with the side wall of the cup-like base bottle to generate a clamping force on the handle at the prong end thereof,
   a substantially horizontal hook-like second end portion at the opposite end of said handle adapted to encompass the neck of a bottle, and
   an intermediate strap-like portion joining said hook-like second end portion with said prong-like first end portion,
   said intermediate strap-like portion including a finger gripping loop intermediate the ends thereof.

2. The reusable handle of claim 1 wherein said hook-like member on said second end portion includes an opening therein and a semi-circular interior portion joined to the portion defining the opening therein.

3. The reusable handle of claim 1 wherein the intermediate strap-like portion includes
   a first arcuate portion and
   a substantially vertical second portion,
   said finger gripping loop portion being formed on said second vertical portion of said strap-like member and
   said first arcuate portion joining said horizontal hook-like member to said second loop containing portion.

4. The reusable handle of claim 1 wherein the first arcuate portion of said strap-like member includes a portion of substantially T-shaped cross-section.

5. The reusable handle of claim 1 wherein the first arcuate portion of said strap-like member includes a portion of substantially X-shaped cross-section.

6. The reusable handle of claim 1 wherein said prong-like member includes a substantially horizontal lip above said convex-concave arcuate portion adapted to be seated on an edge of said cup-like base.

* * * * *